United States Patent
Bao et al.

(10) Patent No.: US 9,471,387 B2
(45) Date of Patent: Oct. 18, 2016

(54) SCHEDULING IN JOB EXECUTION (71) Applicant: International Business Machines Corporation, Armonk, NY (US)

(72) Inventors: Xiao M. Bao, Beijing (CN); Guan C. Chen, Beijing (CN); Qi Guo, Pittsburgh, PA (US); Yan Li, Beijing (CN); Tao Liu, Beijing (CN); Wen tao Tang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/083,404

(22) Filed: Mar. 29, 2016

(65) Prior Publication Data

US 2016/0210171 A1 Jul. 21, 2016

Related U.S. Application Data (63) Continuation of application No. 14/528,595, filed on Oct. 30, 2014.

(30) Foreign Application Priority Data

Oct. 31, 2013 (CN) .......................... 2013 1 0531204

(51) Int. Cl.
  *G06F 9/46* (2006.01)
  *G06F 9/50* (2006.01)
(52) U.S. Cl.
  CPC .................... *G06F 9/505* (2013.01)
(58) Field of Classification Search
  CPC ....................................... G06F 9/505
  USPC ....................................... 718/104
  See application file for complete search history.

(56) References Cited

U.S. PATENT DOCUMENTS

| 8,732,720 B2* | 5/2014 | Verma | G06F 9/5066 707/705 |
| 8,924,978 B2* | 12/2014 | Meng | G06F 9/5061 718/102 |
| 9,032,416 B2* | 5/2015 | Swart | 718/100 |

(Continued)

OTHER PUBLICATIONS

Guo et al., "iShuffle: Improving Hadoop Performance with Shuffle-on-Write", USENIX Association, 10th International Conference on Autonomic Computiong (ICAC '13), pp. 107-117.

(Continued)

*Primary Examiner* — Qing Chen
*Assistant Examiner* — Clint Thatcher
(74) *Attorney, Agent, or Firm* — Bryan D. Wells; Maeve M. Carpenter (57) ABSTRACT

The present invention relates to a method, apparatus, and computer program product for scheduling in job execution. According to embodiments of the present invention, there is provided a method for scheduling a plurality of job slots shared by one or more pre-processors and one or more post-processors in job execution, wherein the data generated by the pre-processor(s) will be fed to the post-processor(s) for processing. The method comprises: determining an overall data generation speed of the pre-processor(s); determining an overall data consumption speed of the post-processor(s); and scheduling allocation of at least one of the job slots between the pre-processor(s) and the post-processor(s) based on the overall data generation speed and the overall data consumption speed. Corresponding apparatus is disclosed as well.

20 Claims, 3 Drawing Sheets

(56) References Cited

U.S. PATENT DOCUMENTS

| | | | |
|---|---|---|---|
| 2013/0104140 A1 | 4/2013 | Meng et al. | |
| 2013/0191843 A1* | 7/2013 | Sarkar | G06F 9/5066 718/105 |
| 2013/0290976 A1* | 10/2013 | Cherkasova | G06F 9/5038 718/104 |
| 2014/0019987 A1* | 1/2014 | Verma | G06F 9/5038 718/103 |
| 2014/0215487 A1* | 7/2014 | Cherkasova | G06F 9/5083 718/106 |
| 2014/0245298 A1* | 8/2014 | Zhou | G06F 9/455 718/1 |
| 2015/0058843 A1* | 2/2015 | Holler | G06F 9/455 718/1 |

OTHER PUBLICATIONS

Wang, "Improving MapReduce Performance Under Widely Distributed Environments", A thesis submitted to the faculty of the University of Minnesota, Jun. 2012, 70 pages.

Bao et al., "Scheduling in Job Execution", China Application No. 201310531204.3, Filed on Oct. 31, 2013, 24 pages.

Bao et al., "Scheduling in Job Execution", U.S. Appl. No. 14/528,595, filed Oct. 30, 2014, 26 pages.

\* cited by examiner

SCHEDULING IN JOB EXECUTION

CROSS-REFERENCE TO RELATED APPLICATIONS

This application claims the benefit of priority under 35 U.S.C. §119 from Application No. 201310531204.3, filed on Oct. 31, 2013 in China.

FIELD OF INVENTION

Embodiments of the present invention generally relate to the field of computer technology, and more specifically, to a method and apparatus for scheduling in job execution.

BACKGROUND OF INVENTION

Parallel computation has become increasingly popular. Generally, a job may be divided into a plurality of task phases. The task at each phase may be dispatched to a plurality of different nodes so as to be executed in parallel. Then, the data generated at the preceding phase (called "intermediate data") is passed to the task at the next phase for subsequent processing. There may be a plurality of tasks that can be executed in parallel during the same phase. For example, the MapReduce pattern is widely used in concurrent computation, wherein one job is divided into a Map phase and a Reduce phase. At the Map phase and Reduce phase, there may be a plurality of concurrently executable tasks, respectively. The intermediate result generated by the Map task is fed to the downstream Reduce task.

The phase of transmitting data between Map and Reduce may be called a scheduling phase or Shuffle. The scheduling phase is crucial for the overall performance of job execution. In some application scenarios, the execution time of the scheduling phase may amount to 90% of the total time of the Reduce task. In the traditional MapReduce pattern, the Map task and the Reduce task use different job slots, respectively. In order to improve the schedule, there has been proposed the architecture where the Map task and the Reduce task share a plurality of job slots. In this way, the utilization of resources such as a central processing unit (CPU), a network, and a disk of a node can be improved, and the time taken for the schedule can be reduced.

However, in such a MapReduce implementation, imbalance always occurs in the scheduling phase. When the data generation speed of the Map phase is lower than the data consuming speed of the Reduce phase, many reducers responsible for reducing might be in an idle or waiting state. On the contrary, when the speed of the Map phase is greater than the speed of the Reduce phase, the intermediate result generated by the mapper cannot be fetched in time. In order to solve this imbalance, a solution of controlling when to start the Reduce task using parameters has been proposed. Besides, a solution of controlling the schedule based on the ratio between the Map task and the Reduce task is also well-known. However, the parameters should be manually designed by human experts. Moreover, for different applications and different phases, the optimal parameters might be different. Therefore, the known parameter control cannot completely overcome the imbalance between the Map task and the Reduce task.

Specifically, it should be understood that the schedule issue between different phases of tasks are widely present in various parallel or distributive computations, not only limited to the MapReduce pattern as above depicted exemplarily. Generally, in parallel processing of a job, the mismatch of processing speeds between a task at the upstream phase (referred to as "upstream task") and a task at the downstream phase (referred to as "downstream task") will cause imbalance at the scheduling phase, thereby generating an adverse impact on the overall execution efficiency. For example, in parallel job processing in conformity with architectures such as MPI (Message Passing Interface), it is likely required to handle the potential imbalance between the upstream task and the downstream task.

SUMMARY

In order to solve the above and other potential problems, the present invention provides a method, apparatus, and computer program product for developing, testing, and deploying an application.

According to one aspect of the present invention, there is provided a method for scheduling a plurality of job slots shared by one or more pre-processors and one or more post-processors in job execution, wherein the data generated by the pre-processor(s) will be fed to the post-processor(s) for processing. The method comprises: determining an overall data generation speed of the pre-processor(s); determining an overall data consumption speed of the post-processor(s); and scheduling allocation of at least one of the job slots between the pre-processor(s) and the post-processor(s) based on the overall data generation speed and the overall data consumption speed.

According to a second aspect of the present invention, there is provided an apparatus for scheduling a plurality of job slots shared by one or more pre-processors and one or more post-processors in job execution, wherein the data generated by the pre-processor(s) will be fed to the post-processor(s) for processing. The apparatus comprises: a generation speed determining unit configured to determine an overall data generation speed of the pre-processor(s); a consumption speed determining unit configured to determine an overall data consumption speed of the post-processor(s); and a scheduling unit configured to schedule allocation of at least one of the job slots between the pre-processor(s) and the post-processor(s) based on the overall data generation speed and the overall data consumption speed.

It will be understood through the following depiction that according to the embodiment of the present invention, execution of the upstream task and downstream task may be dynamically scheduled according to the actual condition of job execution without the need of human interference. In this way, the resource utilization of the system can be significantly promoted, and the overall efficiency of job execution can be enhanced. Moreover, embodiments of the present invention may be applicable to various different applications and different application phases.

BRIEF DESCRIPTION OF DRAWINGS

The above and other objectives, features and advantages of the present invention will become more apparent through more detailed depiction of the exemplary embodiments of the present invention with reference to the accompanying drawings.

FIG. 4 shows an exemplary flow chart of a method for selecting a post-processor to be swapped in;

Throughout the drawings, the same reference generally refers to the same components in the embodiments of the present disclosure.

DETAILED DESCRIPTION

Hereinafter, preferable embodiments of the present invention will be depicted in more detail with reference to the accompanying drawings. Although the preferred embodiments of the present invention are shown in the accompanying drawings, it should be understood that the present disclosure can be implemented in various manners and thus should not be construed to be limited to the embodiments depicted herein. On the contrary, those embodiments are provided for the thorough and complete understanding of the present disclosure, and for the capability of completely conveying the scope of the present disclosure to those skilled in the art.

The skilled in the art would appreciate that the present invention may be implemented as an apparatus, a method, or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
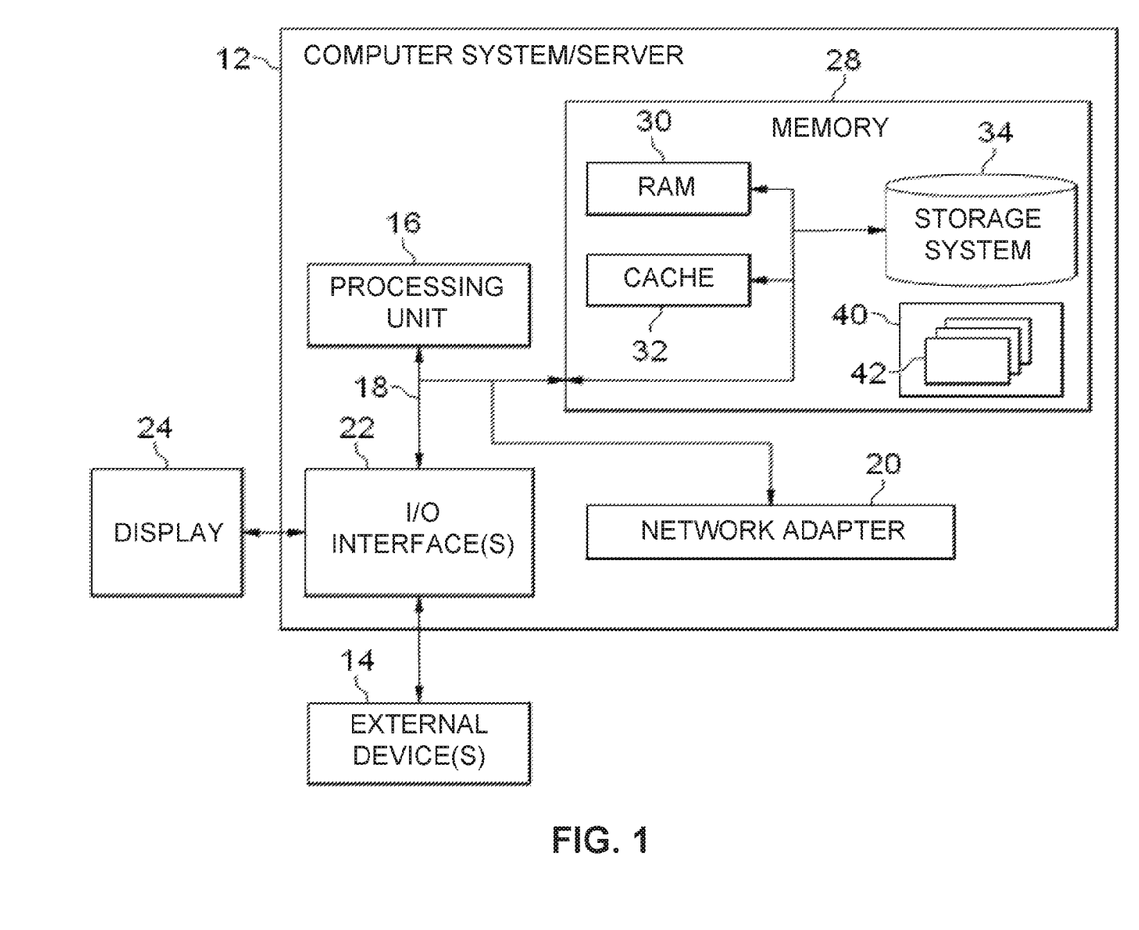
FIG. 1 shows a schematic block diagram of an exemplary computer system/server which is applicable to implement embodiments of the present invention.

Hereinafter, exemplary embodiments of the present invention will be described in detail with reference to the drawings. FIG. 1 shows an exemplary computer system/server 12 which is applicable to implement embodiments of the present invention. The computer system/server 12 as shown in FIG. 1 is only an example, which should not construct any limitation to the functions and application scope of embodiments of the present invention.

As shown in FIG. 1, depicted as computing environment 10, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not shown in FIG. 1, generally called "a hard disk driver"). Although not shown in FIG. 1, a magnetic disk driver for reading/writing a mobile, non-volatile magnetic disk (for example, a "floppy disk") and an optical disk driver for reading/writing a mobile, non-volatile optical disk (for example, CD-RON, DVD-RON, or other optical medium) may be provided. In these cases, each driver may be connected to the bus 18 via one or more data medium interfaces. The memory 28 may comprise at least one program product that has a set (for example, at least one) program modules, and these program modules may be configured to perform the functions of various embodiments of the present invention.

A program/utility tool 40 comprising a set (at least one) of a program module 42 may be stored in for example the memory 28; such program module 42 comprises, but not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more external devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As shown in the figure, a network adaptor 20 communicates with other modules of the computer system/server 12 via the bus 18. It should be appreciated that although not shown in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

Figure 2:
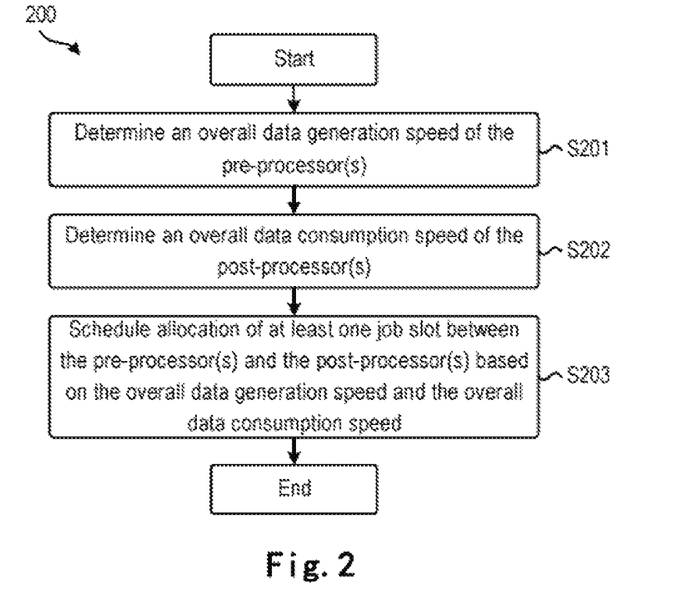
FIG. 2 shows an exemplary flow chart of a method for scheduling a plurality of job slots shared by one or more pre-processors and one or more post-processors in job execution according to embodiments of the present invention.

Reference is now made to FIG. 2, which shows a flow chart of a method 200 for scheduling a plurality of job slots shared by one or more pre-processors and one or more post-processors in job execution according to embodiments of the present invention. The term "job" used here refers to any computation task, e.g., data analysis, data processing, data mining, etc. According to embodiments of the present invention, job processing is divided into different phases of tasks. A task that was executed in an earlier phase is called an "upstream task," for example, a Map task in the MapReduce pattern. A task that will be executed in a subsequent phase is called a "downstream task," for example, a Reduce task in the MapReduce pattern. It should be noted that as mentioned above, the scope of the present invention is not limited to the MapReduce pattern. To the contrary, embodiments of the present invention are applicable to all the patterns where the job processing is divided into different phases and where it is necessary to perform scheduling between the upstream and downstream tasks. For example, embodiments of the present invention may be used to perform parallel job processing in conformity with any MPI pattern.

According to embodiments of the present invention, a pre-processor(s) is used to process the upstream task in job execution, for example, the Map task in the MapReduce pattern. A post-processor(s) is used to process the downstream task in job execution, for example, the Reduce task in the MapReduce pattern. It would be appreciated that there is a dependency between the upstream and downstream tasks. Hence, the data generated by a pre-processor will be fed to one or more post-processors for processing. Likewise, a post-processor may receive data from one or more pre-processors. According to embodiments of the present invention, the pre-processor(s) and post-processor(s) may be a program, thread, routine, hardware device and the like for processing tasks. Additionally, the pre-processor(s) and the post-processor(s) may be distributed on one or more different nodes.

Specifically, according to embodiments of the present invention, the pre-processor(s) and the post-processor(s) share a plurality of common job slots. A job slot is a unit of resource scheduling. Only after a job slot is allocated for a pre-processor or a post-processor, the corresponding upstream task or downstream task can be processed. To the contrary, a processor without being assigned a job slot is in an idle state. Generally, after execution of a job starts, all job slots are allocated to the pre-processor(s) for executing the upstream task. For example, in the MapReduce pattern, after execution of a job starts, all available job slots will be allocated to a mapper in charge of the Map task.

According to the method 200 as shown in FIG. 2, at step S201, an overall data generation speed of one or more pre-processors is determined According to embodiments of the present invention, the overall data generation speed may be calculated as the total amount of data generated by all the pre-processor(s) within a unit time. It would be appreciated that such data are intermediate processing results fed to the post-processors. The overall data generation speed reflects the overall data generation level of all pre-processors in the system.

Next, at step S202, an overall data consumption speed of one or more post-processors is determined. According to embodiments of the present invention, the overall data consumption speed may be represented as the total amount of data consumed or processed by all the post-processor(s) within a unit time. The overall data consumption speed reflects the overall data throughput level of all the post-processor(s) in the system.

At step S203, allocation of at least one job slot is scheduled between the pre-processor(s) and the post-processor(s) based, at least in part, on the overall data generation speed of the pre-processor(s) as calculated at step S201 and the overall data generation speed of the post-processor(s) as calculated at step S202, so as to reduce, lower, or even eliminate the imbalance between the data generation speed of the pre-processor(s) and the data consumption speed of the post-processor(s). In particular, if the overall data generation speed of the pre-processor(s) is greater than the overall data consumption speed of the post-processor(s), it is determined that data congestion likely occurs at the scheduling phase. In other words, at this point, the data generated and outputted by the pre-processor(s) cannot be received and processed in time by the post-processor(s). It would be appreciated that it might consume extra resources to store these intermediate data. At this point, according to embodiments of the present invention, an appropriate scheduling strategy may be determined based on the difference in situation between the overall generation speed and the overall consumption speed.

According to embodiments of the present invention, the scheduling includes de-allocating a job slot(s) from the pre-processor(s) or from the post-processor(s). Optionally, the scheduling may also include re-allocating the de-allocated job slot(s) to the pre-processor(s) or to the post-processor(s). For example, if the difference between the overall generation speed of the pre-processor(s) and the overall consumption speed of the post-processor(s) exceeds an upper limit threshold, then one or more job slots may be de-allocated from the pre-processor(s), and the job slots that are de-allocated from the pre-processor(s) may be re-allocated to one or more post-processors. In some embodiments of the present invention, the number of job slots which are de-allocated from the pre-processor(s) may be obtained based on the difference between the overall data generation speed and the overall data consumption speed.

Alternatively, if the difference between the overall data generation speed of the pre-processor(s) and the overall data consumption speed of the post-processor(s) is smaller than an upper limit threshold but greater than a lower limit threshold, it is allowed to only de-allocate the job slots from at least one pre-processor, without re-allocating to the post-processor(s). Besides, if the difference is lower than the lower limit threshold, it indicates that the imbalance between the pre-processor(s) and the post-processor(s) is not very serious. At this point, it is allowed not to execute any scheduling action so as to cause unnecessary overheads caused by excessive system switches.

On the other hand, if the overall data generation speed of the pre-processor(s) is smaller than the overall data consumption speed of the post-processor(s), there might be hunger of the post-processor(s) at the scheduling phase. In other words, in this event, the data generated and outputted by the pre-processor(s) cannot satisfy the need of the post-processor(s), and one or more post-processors will be idle or waiting. Accordingly, the resources allocated to the idle post-processor(s) will be wasted. At this point, according to embodiments of the present invention, for example, one or more job slots may be de-allocated from the post-processor(s), and possibly re-allocated to one or more pre-processor(s). It is similar to the above depiction, which will not be detailed here.

The method 200 may be executed periodically, and/or executed in response to user command. By executing the method 200, the imbalance between different phases in the job processing may be monitored dynamically in real time, and the execution speeds of the upstream task and the downstream task are correspondingly adjusted by re-allocating the job slot(s), such that the whole system approaches to a balanced state, thereby enhancing the overall system performance.

Figure 3:
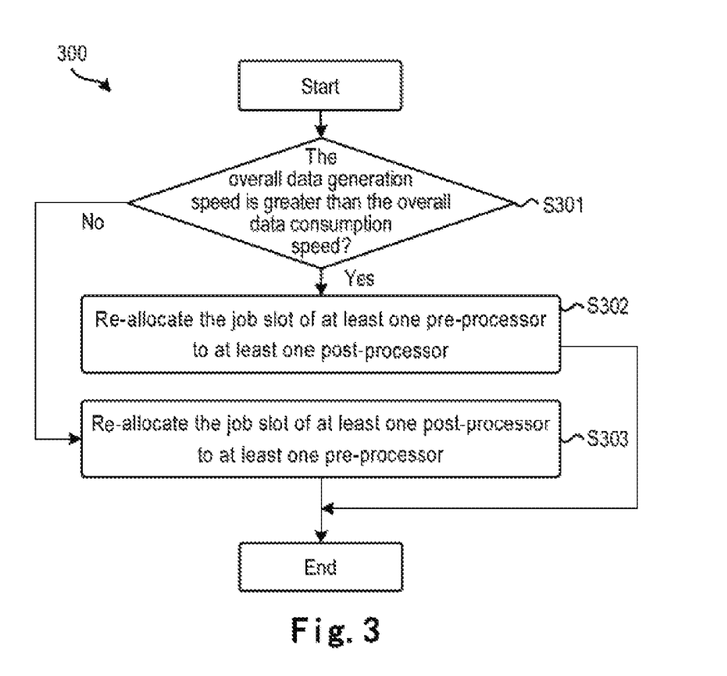
FIG. 3 shows an exemplary flow chart of a method for scheduling job slots according to embodiments of the present invention.

FIG. 3 shows a flow chart of a method 300 for scheduling shared job slots according to an exemplary embodiment of the present invention. The method 300 may be regarded as a particular implementation of step S203 in the method 200 as above described with reference to FIG. 2.

After the method 300 starts, at step S301, determine whether an overall data generation speed of a pre-processor(s) is greater than an overall data consumption speed of the post-processor(s). If so, then the method 300 proceeds to step S302. As mentioned above, when execution of a job initially starts, all job slots are generally allocated to pre-processor(s), for example, a mapper in the MapReduce pattern. At this point, the overall data generation speed of the pre-processor(s) is far greater than the overall data consumption speed of the post-processor(s). Therefore, at the initial phase of job execution, method 300 might likely execute step S302.

At step S302, select at least one pre-processor, such that a job slot allocated to the selected at least one pre-processor is re-allocated to at least one post-processor (e.g., a reducer). In other words, at this point, for at least one job slot, the upstream task is swapped out and the downstream task is swapped in. Specifically, according to some embodiments of the present invention, such swap needs to be executed after completion of the upstream task executed by the pre-processor. For example, in the MapReduce pattern, it is generally required to re-allocate an associated job slot to the reducer after completion of the Map task executed by the mapper.

According to embodiments of the present invention, a processor that is to be swapped out may be selected according to the time sequence of the current task completed by the pre-processor. Specifically, in such an embodiment, starting from the time when a scheduling action needs to be executed, one or more pre-processors that complete the current upstream task earliest will be swapped out. Alternatively or additionally, the task processing capability of the pre-processor(s) may be considered. For example, for a pre-processor that completes the current upstream task, if its data feed speed (i.e., the amount of data fed by the pre-processor towards all the post-processor(s) within a unit time) is smaller than the predetermined threshold, that pre-processor will be skipped off without being swapped out. In this way, a pre-processor with a relatively large data generation speed may be swapped out in priority, so as to guarantee that the imbalance in the system will be eliminated relatively fast.

According to embodiments of the present invention, a post-processor to be swapped in may be selected according to various standards. For example, in some embodiments, the post-processor may be randomly selected. Alternatively, a post-processor to which a job slot will be allocated may be selected based on the speeds of feeding data from all the pre-processor(s) to each post-processor. Specifically, for each post-processor, it is possible to calculate the data amount of data fed from all the pre-processor(s) to the post-processor in the system within a unit time, i.e., data feed speed (denoted as G). In this way, one or more post-processors with the largest G value may be selected. It would be appreciated that it helps to quickly eliminate the imbalance in the system.

According to some embodiments of the present invention, the locality level of data feedback from the pre-processor(s) to each post-processor may be additionally considered. It would be appreciated that for one post-processor, if several pre-processors feeding data thereto are located at a different node, it might cause relatively significant data transmission overheads. According to embodiments of the present invention, by considering the locality level of data feed, the overheads incurred by transmitting data between different nodes may be effectively avoided. Hereinafter, an example in this aspect will be depicted with reference to FIG. 4.

Figure 4:
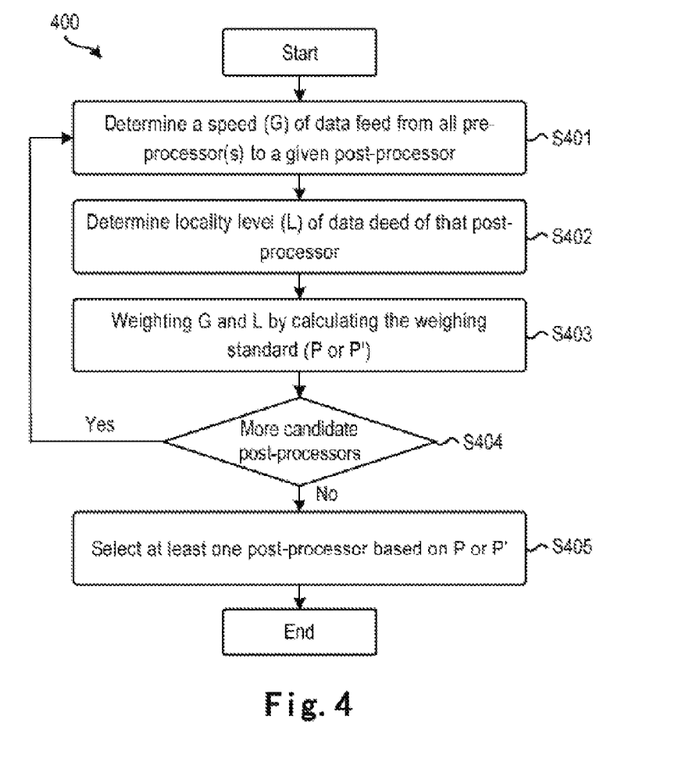

FIG. 4 shows a block diagram of a method 400 for selecting a post-processor. After method 400 starts, at step S401, for each candidate post-processor, a speed G of feeding data from all the pre-processor(s) towards the post-processor is determined.

Next, at step S402, a locality level of data feed associated with the post-processor is determined. To this end, for each candidate post-processor, a data feed speed (denoted as A) of these pre-processors that are located at the same physical node as the post-processor towards the post-processor may be determined. In such an embodiment, a ratio value $L=A/G$ may be calculated at step S402, for representing the locality level of data feed associated with the candidate post-processor.

The method 400 then proceeds to step S403, where the data feed speed of the post-processor and the locality level of data feed are weighted. For example, in some embodiments, a weighting standard (P) for a given post-processor may be calculated in a weighted average manner.

$$P = \alpha G/M + (1-\alpha)L$$

wherein a is a weight coefficient for example ranging [0, 1], M is an aggregated speed of feeding data from all the pre-processor(s) towards the post-processor. Particularly, in some embodiments, a network bandwidth resource might be relatively scarce, and is therefore crucial for system performance. In these embodiments, it may be set coefficient $\alpha=0$. At this point, the weighting standard P is only determined based on the locality level L of data feed. On the contrary, when the network bandwidth resource is relatively sufficient, it may be set $\alpha=1$, thereby only considering the data feed speed of the current post-processor.

In some embodiments, a same weight may be directly assigned to the data feed speed and the data feed locality level. At this point, at step S403, P' may be calculated as a weighting standard as follows:

$$P' = G/M + L$$

In the above embodiments, G/M represents the percentage of the data feed speed of the current post-processor to the aggregated data feed speed of the pre-processor(s) towards the post-processor. It is a relative measurement of a data feed speed of the post-processor. In other words, in these embodiments, G is normalized relative to M. Such normalization is not essential. Alternatively, the value of the data feed speed G of the current post-processor may be directly used. For example, in the above equations of calculating P and P', G/M may be replaced as G.

In the following step S404, it is determined whether there are other to-be-processed candidate post-processor(s). If so, the method 400 returns to step S401 to execute reiteratively. Otherwise, the method 400 proceeds to step S405 to select one or more post-processors with the largest P or P' values to allocate job slots thereto. It would be appreciated that the post-processor(s) with the largest P or P' value have an optimal weighting between the data feedback speed and the data feed locality level. It helps to reduce or eliminate the imbalance in the system to the least to select such a post-processing.

Figure 5:
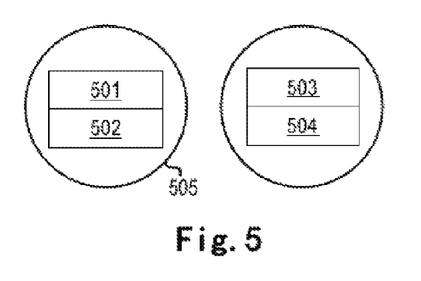
FIG. 5 shows an exemplary schematic block diagram of selecting a post-processor according to an embodiment of the present invention.

FIG. 5 shows a schematic diagram of a preferred embodiment of selecting a post-processor using method 400. In the example shown in FIG. 5, the job is processed according to the MapReduce pattern. Particularly, suppose there are 8 mappers responsible for executing the Map task. Moreover, suppose there are 2 nodes each being distributed with 2 job slots. First, all of the 4 job slots are allocated to the mapper. After a certain period, it may be found through calculation that the data generation speed of the mapper is far greater than the data processing speed of the reducer (in this case, the data processing speed of the reducer is zero). Therefore, after completion of the execution of the mapper 501, the job slots allocated to the mapper 501 are re-allocated to a reducer.

According to method 400, a data feed speed G associated with each candidate reducer may be calculated. For example, consider a reducer R0, and suppose the speeds at which the four earliest running mappers 501-504 feed data thereto are 1, 2, 3, and 4, respectively. Therefore, the data feed speed of the reducer R0 is $G=1+2+3+4=10$. Besides, the locality level of data feed of the reducer R0 may be calculated. In this example, if R0 is selected, then the job slots that are originally allocated to the mapper 501 and located on the node 505 will be allocated to R0. Therefore, mappers 501 and 502 are mappers located at the same node with R0, and its data feed speeds towards the mapper 501 are 1 and 2, respectively. In this way, the data locality level L of the reducer R0 may be calculated as $L=A/G=(1+2)/10=0.3$.

Suppose the speed at which all mappers output data to all reducers is M=30. For example, it may be calculated that P' for R0=G/M+L=10/30+0.3=0.63. Similarly, the P' of other reducers may be calculated, and the reducer with the largest P' is selected to be allocated with the job slots.

It is noted that according to embodiments of the present invention, the method of selecting a post-processor as depicted above with reference to FIG. 4 is likewise applicable to selection of a pre-processor. In other words, a pre-processor to be swapped out may be selected according to at least one of the data generation speed of the pre-processor and the locality level of the data feed of the post-processor. The specific details will be omitted here.

Return to FIG. 3, if it is determined at step S301 that the overall data generation speed of the pre-processor(s) is smaller than the overall data consumption speed of the post-processor(s) (i.e., branch "No"), then the method 300 proceeds to step S303, where the job slots allocated to the at least one post-processor are re-allocated to at least one pre-processor. In particular, according to embodiments of the present invention, the re-allocation does not need to wait for completion of the downstream task executed by the post-processor(s). For example, in the MapReduce pattern, before completion of the downstream task executed by the selected at least one post-processor (reducer) that is to be swapped out, the job slots associated with the post-processor(s) may be occupied preemptively. In this way, the imbalance in the system may be processed promptly, thereby shortening the response time of scheduling.

Various embodiments of implementing the method of the present invention have been depicted above with reference to the drawings. Those skilled in the art would appreciate that the above method may be implemented by software or by hardware or by a combination of software and hardware. Besides, those skilled in the art would appreciate that by performing various steps in the above method by software, hardware or a combination of hardware or software, an apparatus for scheduling in job execution based on the same inventive concept may be provided. Even if the present apparatus is identical in hardware structure to a general-purpose processing apparatus, due to the role played by the software therein, the present apparatus exhibits a characteristic distinguishable from the general-purpose processing apparatus, which thereby forms the apparatus according to various embodiments of the present invention. The apparatus in the present invention includes a plurality of units or modules that are configured to perform corresponding steps. Those skilled in the art, through reading the present description, would appreciate how to compile a program to implement the actions performed by the units or modules. Hereinafter, an apparatus for scheduling a plurality of job slots shared by one or more pre-processors and one or more post-processors according to various embodiments of the present invention with reference to FIG. 6. Since the apparatus and the method are based on the same inventive concept, the same or corresponding implementation details therein are likewise applicable to the apparatus corresponding to the method. Since such implementation details have been depicted specifically and comprehensively above, they would not be detailed hereinafter.

Figure 6:
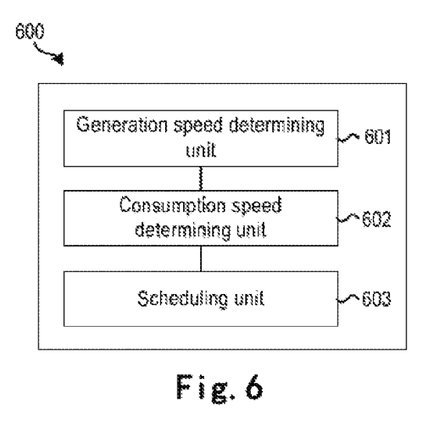
FIG. 6 shows a schematic block diagram of an apparatus for scheduling a plurality of job slots shared by one or more pre-processors and one or more post-processors in job execution, wherein the data generated by the pre-processor(s) will be fed to the post-processor(s) for processing.

Refer to FIG. 6, which shows a schematic block diagram of an apparatus for scheduling a plurality of job slots shared by one or more pre-processors and one or more post-processors in job execution according to embodiments of the present invention. As depicted above, a pre-processor is used for executing an upstream task of the job, and a post-processor is used for executing a downstream task of the job.

As shown in the figure, the apparatus 600 comprises: a generation speed determining unit 601 configured to determine an overall data generation speed of the pre-processor(s); a consumption speed determining unit 602 configured to determine a overall data consumption speed of the post-processor(s); and a scheduling unit 603 configured to schedule allocation of at least one of the job slots between the pre-processor(s) and the post-processor(s) based on the overall data generation speed and the overall data consumption speed.

In some optional embodiments, the scheduling unit 603 may comprise: a first re-allocating unit configured to re-allocate the job slots allocated to the at least one pre-processor to at least one of the post-processor(s) after completion of the upstream task executed by at least one of the pre-processor(s) if the overall data generation speed is greater than the overall data consumption speed.

In some optional embodiments, the apparatus 600 may further comprise a post-processor selecting unit configured to select the at least one post-processor based on at least one of the following: speed of data feed from the pre-processor(s) towards the at least one post-processor; and locality level of data feed from the pre-processor(s) towards the at least one post-processors. In particular, in some optional embodiments, the apparatus 600 may comprise a locality determining unit configured to determine the locality level of the data feed based on the following factors: the speed of data feed from the pre-processor(s) towards the at least one post-processor(s); and speed of data feed from the pre-processor(s) located at the same node with the at least one post-processor towards the at least one post-processor.

In some optional embodiments, the scheduling unit 603 may comprise: a second re-allocating unit configured to re-allocate the job slots that are allocated to at least one of the post-processor(s) to at least one of the pre-processor(s) if the overall data generation speed is smaller than the overall data consumption speed. In some optional embodiments, the second re-allocating unit may comprise: a pre-emptive occupation unit configured to preemptively occupy the job slot before completion of the downstream task executed by the at least one post-processor.

In some optional embodiments, when the job is processed according to the MapReduce pattern, the pre-processor(s) may include one or more mappers, and the post-processor(s) may include one or more reducers.

Please note that for the sake of clarity, FIG. 6 does not show optional units or sub-units comprised in the apparatus. However, it should be understood that all features and operations as depicted above are suitable to apparatus 600, which are therefore omitted here. Moreover, the partitioning of the units or subunits in respective apparatuses is not limitative, but exemplary, intended to describe their major functions or operations logically. Functions of one unit may be implemented by multiple units; in turn, multiple units may also be implemented by one unit. The scope of the present invention is not limited thereto. Moreover, the units comprised in the apparatus 600 as depicted above may be implemented in various manners, including software, hardware, firmware, or any combination thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for scheduling in job execution, the method comprising: determining, by one or more computer processors, a data feed speed of a first post-processor, wherein the data feed speed of the first post-processor is a speed of feeding data from a plurality of pre-processors to the first post-processor; determining, by one or more computer processors, a data feed speed of a second post-processor, wherein the data feed speed of the second post-processor is a speed of feeding data from the plurality of pre-processors to the second post-processor; determining, by one or more computer processors, a local data feed speed of the first post-processor, wherein the local feed speed of the first post-processor is a speed of feeding data, to the first post-processor, from one or more pre-processors of the plurality of pre-processors that are co-located with the first postprocessor on a physical node of the first post-processor; determining, by one or more computer processors, a local data feed speed of the second post-processor, wherein the local feed speed of the second post-processor is a speed of feeding data, to the second-processor, from one or more pre-processors of the plurality of pre-processors that are co-located with the second post-processor on a physical node of the second post-processor; determining, by one or more computer processors, a locality level of the first post-processor based, at least in part, on the data feed speed of the first post-processor and the local data feed speed of the first post-processor; determining, by one or more computer processors, a locality level of the second post-processor based, at least in part, on the data feed speed of the second post-processor and the local data feed speed of the second postprocessor; determining, by one or more computer processors, a weighting standard of the first post-processor based, at least in part, on the data feed speed of the first-post processor and the locality level of the first post-processor; determining, by one or more computer processors, a weighting standard of the second post-processor based, at least in part, one the data feed speed of the second post-processor and the locality level of the second post processor; and determining, by one or more computer processors, that the weighting standard of the first post-processor is greater than the weighting standard of the second post-processor, and in response, allocating a job slot to the first post-processor.

2. The method of claim 1, wherein the weighting standard of the first post-processor and the weighting standard of the second post-processor are determined using an expression comprising:

$$P=\alpha N+(1-\alpha)L$$

wherein:
P is a weighting standard of a respective post-processor;
α is a weight coefficient;
N is a value that is determined based, at least in part, on a data feed speed of the respective post-processor; and
L is a locality level of the respective post-processor.

3. The method of claim 2, wherein the weight coefficient equals zero based, at least in part, on a network bandwidth resource.

4. The method of claim 2, wherein the weight coefficient equals one based, at least in part, on a network bandwidth resource.

5. The method of claim 2, wherein N is the data feed speed of the respective post-processor divided by an aggregated data feed speed of the respective post-processor such that the data feed speed of the respective post-processor is normalized relative to the aggregated data feed speed, and wherein the aggregated data feed speed is an aggregated speed of feeding data from the plurality of pre-processors.

6. The method of claim 2, wherein N is the data feed speed of the respective post-processor.

7. The method of claim 1, wherein the weighting standard of the first post-processor and the weighting standard of the second post-processor are determined using an expression comprising:

$$P=N+L$$

wherein:
P is a weighting standard of a respective post-processor;
N is a value that is calculated based, at least in part, on a data feed speed of the respective post-processor; and
L is a locality level of the respective post-processor.

8. A computer program product for scheduling in job execution, the computer program product comprising:
a computer readable storage medium and program instructions stored on the computer readable storage medium, the program instructions comprising:
program instructions to determine a data feed speed of a first post-processor, wherein the data feed speed of the first post-processor is a speed of feeding data from a plurality of pre-processors to the first post-processor;
program instructions to determine a data feed speed of a second post-processor, wherein the data feed speed of the second post-processor is a speed of feeding data from the plurality of pre-processors to the second post-processor;
program instructions to determine a local data feed speed of the first post-processor, wherein the local feed speed of the first post-processor is a speed of feeding data, to the first post-processor, from one or more pre-processors of the plurality of pre-processors that are co-located with the first post-processor on a physical node of the first post-processor;
program instructions to determine a local data feed speed of the second post-processor, wherein the local feed speed of the second post-processor is a speed of feeding data, to the second-processor, from one or more pre-processors of the plurality of pre-processors that are co-located with the second post-processor on a physical node of the second post-processor;
program instructions to determine a locality level of the first post-processor based, at least in part, on the data feed speed of the first post-processor and the local data feed speed of the first post-processor;
program instructions to determine a locality level of the second post-processor based, at least in part, on the data feed speed of the second post-processor and the local data feed speed of the second post-processor;
program instructions to determine a weighting standard of the first post-processor based, at least in part, on the data feed speed of the first-post processor and the locality level of the first post-processor;
program instructions to determine a weighting standard of the second post-processor based, at least in part, one the data feed speed of the second post-processor and the locality level of the second post processor; and
program instructions to allocate a job slot to the first post-processor in response to determining that the weighting standard of the first post-processor is greater than the weighting standard of the second post-processor.

9. The computer program product of claim 8, wherein the program instructions to determine the weighting standard of the first post-processor and the program instructions to determine the weighting standard of the second post-processor include program instructions describing an expression comprising:

$$P=\alpha N+(1-\alpha)L$$

wherein:
P is a weighting standard of a respective post-processor;
α is a weight coefficient;
N is a value that is determined based, at least in part, on a data feed speed of the respective post-processor; and
L is a locality level of the respective post-processor.

10. The computer program product of claim 9, wherein the weight coefficient equals zero based, at least in part, on a network bandwidth resource.

11. The computer program product of claim 9, wherein the weight coefficient equals one based, at least in part, on a network bandwidth resource.

12. The computer program product of claim 9, wherein N is the data feed speed of the respective post-processor divided by an aggregated data feed speed of the respective post-processor such that the data feed speed of the respective post-processor is normalized relative to the aggregated data feed speed, and wherein the aggregated data feed speed is an aggregated speed of feeding data from the plurality of pre-processors.

13. The computer program product of claim 9, wherein N is the data feed speed of the respective post-processor.

14. The computer program product of claim 8, wherein the program instructions to determine the weighting standard of the first post-processor and the program instructions to determine the weighting standard of the second post-processor include program instructions describing an expression comprising:

$$P=N+L$$

wherein:
P is a weighting standard of a respective post-processor;
N is a value that is calculated based, at least in part, on a data feed speed of the respective post-processor; and
L is a locality level of the respective post-processor.

15. A computer system for scheduling in job execution, the computer system comprising:
one or more computer processors;
one or more computer readable storage media; and
program instructions stored on the one or more computer readable storage media for execution by at least one of the one or more processors, the program instructions comprising:
program instructions to determine a data feed speed of a first post-processor, wherein the data feed speed of the first post-processor is a speed of feeding data from a plurality of pre-processors to the first post-processor;
program instructions to determine a data feed speed of a second post-processor, wherein the data feed speed of the second post-processor is a speed of feeding data from the plurality of pre-processors to the second post-processor;
program instructions to determine a local data feed speed of the first post-processor, wherein the local feed speed of the first post-processor is a speed of feeding data, to the first post-processor, from one or more pre-processors of the plurality of pre-processors that are co-located with the first post-processor on a physical node of the first post-processor;
program instructions to determine a local data feed speed of the second post-processor, wherein the local feed speed of the second post-processor is a speed of feeding data, to the second-processor, from one or more pre-processors of the plurality of pre-processors that are co-located with the second post-processor on a physical node of the second post-processor;
program instructions to determine a locality level of the first post-processor based, at least in part, on the data feed speed of the first post-processor and the local data feed speed of the first post-processor;
program instructions to determine a locality level of the second post-processor based, at least in part, on the data feed speed of the second post-processor and the local data feed speed of the second post-processor;
program instructions to determine a weighting standard of the first post-processor based, at least in part, on the data feed speed of the first-post processor and the locality level of the first post-processor;
program instructions to determine a weighting standard of the second post-processor based, at least in part, one the data feed speed of the second post-processor and the locality level of the second post processor; and
program instructions to allocate a job slot to the first post-processor in response to determining that the weighting standard of the first post-processor is greater than the weighting standard of the second post-processor.

16. The computer system of claim 15, wherein the program instructions to determine the weighting standard of the first post-processor and the program instructions to determine the weighting standard of the second post-processor include program instructions describing an expression comprising:

$$P=\alpha N+(1-\alpha)L$$

wherein:
P is a weighting standard of a respective post-processor;
α is a weight coefficient;
N is a value that is determined based, at least in part, on a data feed speed of the respective post-processor; and
L is a locality level of the respective post-processor.

17. The computer system of claim 16, wherein the weight coefficient equals zero based, at least in part, on a network bandwidth resource.

18. The computer system of claim 16, wherein the weight coefficient equals one based, at least in part, on a network bandwidth resource.

19. The computer system of claim 16, wherein N is the data feed speed of the respective post-processor divided by an aggregated data feed speed of the respective post-processor such that the data feed speed of the respective post-processor is normalized relative to the aggregated data feed speed, and wherein the aggregated data feed speed is an aggregated speed of feeding data from the plurality of pre-processors.

20. The computer system of claim 16, wherein N is the data feed speed of the respective post-processor.

* * * * *